(12) United States Patent
Gupta et al.

(10) Patent No.: US 12,113,675 B1
(45) Date of Patent: Oct. 8, 2024

(54) FORCED UPGRADE FOR NETWORK MANAGEMENT SYSTEM

(71) Applicant: Hewlett Packard Enterprise Development LP, Spring, TX (US)

(72) Inventors: Gopal Gupta, Bangalore (IN); Sumit Kumar, Bangalore (IN); Peera Reddy Polaka, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/341,505

(22) Filed: Jun. 26, 2023

(51) Int. Cl.
*H04L 41/0893* (2022.01)
*H04L 41/082* (2022.01)

(52) U.S. Cl.
CPC ........ *H04L 41/0893* (2013.01); *H04L 41/082* (2013.01)

(58) Field of Classification Search
CPC .......................... H04L 41/0893; H04L 41/802
See application file for complete search history.

(56) References Cited

U.S. PATENT DOCUMENTS

| | | | |
|---|---|---|---|
| 7,281,270 B2 | 10/2007 | Piesco et al. | |
| 8,050,191 B2 | 11/2011 | Tirpak et al. | |
| 8,612,583 B2 | 12/2013 | Hui et al. | |
| 9,204,329 B2 | 12/2015 | Boyle et al. | |
| 10,142,353 B2 | 11/2018 | Yadav et al. | |
| 10,540,211 B2 | 1/2020 | Hawilo et al. | |
| 10,644,942 B2 | 5/2020 | Kachhla | |
| 11,394,789 B2 | 7/2022 | Gupta et al. | |
| 2019/0317749 A1 | 10/2019 | Hu et al. | |
| 2019/0339957 A1* | 11/2019 | Kripalani | H04L 41/082 |
| 2020/0374188 A1* | 11/2020 | Narasimhan | H04L 41/0816 |
| 2023/0385054 A1* | 11/2023 | Wang | G06F 8/65 |
| 2023/0388819 A1* | 11/2023 | Lin | H04W 24/02 |
| 2024/0007350 A1* | 1/2024 | Gupta | H04L 41/082 |

FOREIGN PATENT DOCUMENTS

| | | | | |
|---|---|---|---|---|
| CN | 1604541 A | * | 4/2005 | |
| CN | 101355454 A | * | 1/2009 | |
| CN | 101616018 B | * | 3/2012 | |
| JP | 3821034 B2 | * | 9/2006 | ......... H04L 41/0213 |
| WO | 2013000320 A1 | | 1/2013 | |
| WO | 2020091592 A1 | | 5/2020 | |
| WO | WO-2021093898 A1 | * | 5/2021 | ......... H04L 41/0659 |

* cited by examiner

*Primary Examiner* — Oanh Duong
(74) *Attorney, Agent, or Firm* — Slater Matsil, LLP

(57) ABSTRACT

In an example implementation consistent with the features disclosed herein, network management system deployments with a large operational footprint are given a longer grace period before they are forced to upgrade than network management system deployments with a small operational footprint. Criticality scores for the network management system deployments are calculated based on the operational footprints of the network management system deployments. The network management system deployments are grouped into criticality groups based on the criticality scores for the network management system deployments. The network management system deployments are forced to upgrade within timelines that are based on the criticality groups in which the network management system deployments are grouped.

20 Claims, 6 Drawing Sheets

FORCED UPGRADE FOR NETWORK MANAGEMENT SYSTEM

BACKGROUND

A network management system is used to maintain and secure a network. Specifically, a network management system allows for the management of network nodes. A network management system collects data from the network nodes and provides a central point of control for the network nodes. Additionally, a network management system may help identify network issues. Further yet, a network management system may be used to monitor network resources and security. A network management system may be used in a hybrid cloud environment. In a hybrid cloud environment, data is shared or transferred between an on-premises private cloud and a public cloud. Upgrading of a network management system is a common administrative challenge in a hybrid cloud environment.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
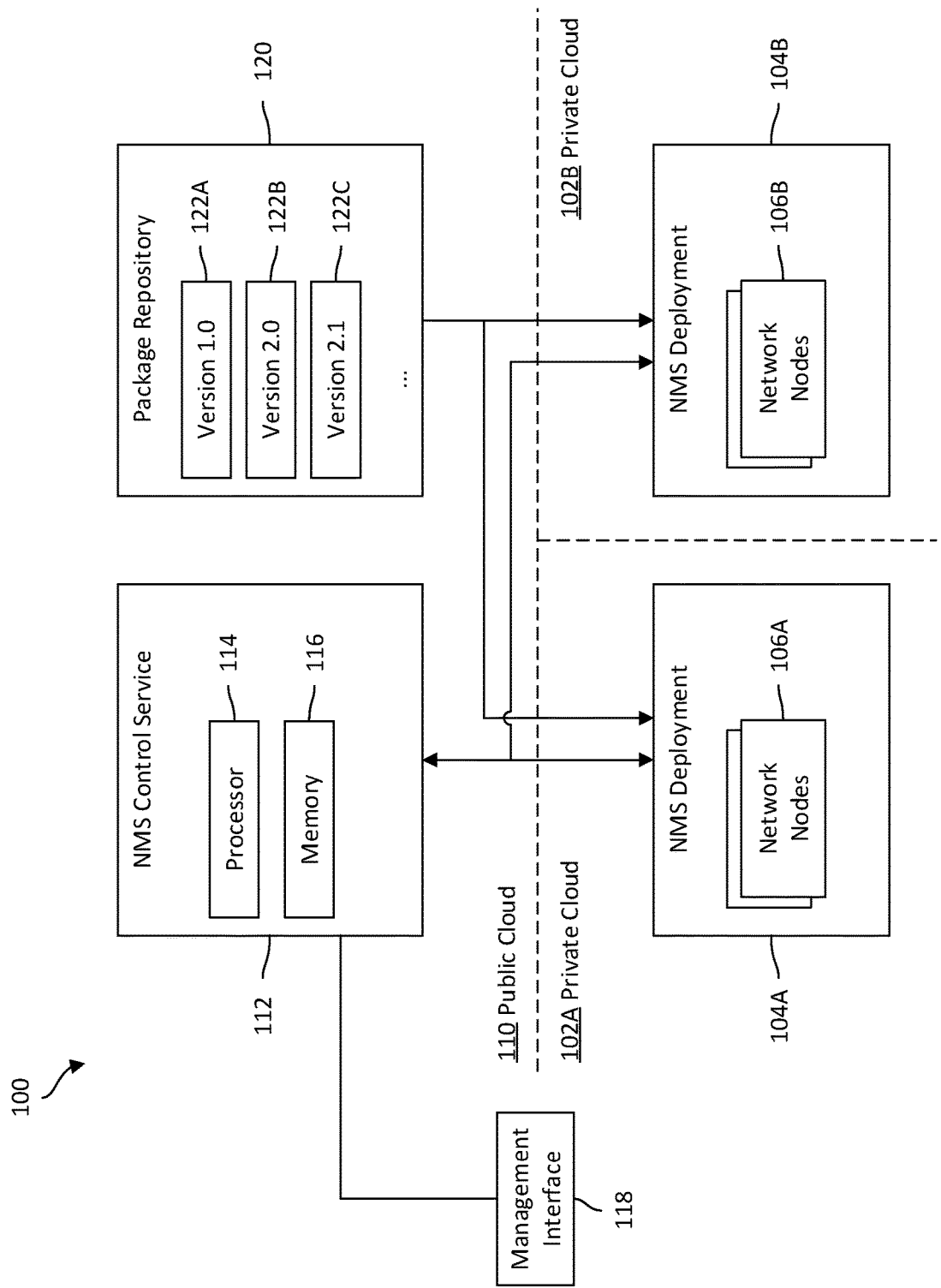
FIG. 1 is a block diagram of a hybrid cloud environment, according to some implementations.

The following disclosure provides many different examples for implementing different features. Specific examples of components and arrangements are described below to simplify the present disclosure. These are, of course, merely examples and are not intended to be limiting.

In a hybrid cloud environment, a network management system (NMS) deployed at an on-premises private cloud may use the same software package as that used in a public cloud. To avoid a software package mismatch between the public cloud and the private cloud, periodic upgrade of the NMS deployed at the private cloud may be mandated using a forced upgrade mechanism. For example, when a new major version of a software package for the NMS is released, the NMS deployment may be forced to upgrade to the new major version within a certain timeline. Forcing upgrade of the NMS deployment helps avoid fragmentation of the hybrid cloud environment. Maintenance overhead of a hybrid cloud environment may thus be reduced.

A cloud provider may control NMS deployments for different customers. The NMS deployments may be classified with different criticality scores (e.g., levels of criticality), depending on the operational footprints of the NMS deployments. For example, an NMS deployment for a customer with a small operational footprint may have a lower criticality score than an NMS deployment for a customer with a large operational footprint, as a service interruption for the customer with a large operational footprint would have a larger organizational disruption than a service interruption for the customer with a small operational footprint. Thus, failure of a forced upgrade may impact a customer with a large operational footprint more than it would impact a customer with a small operational footprint. For example, an NMS deployment for a hospital may have a larger criticality score than an NMS deployment for a retailer.

In an example implementation, NMS deployments controlled by a cloud provider are grouped into lower or higher criticality groups. The grouping may be automatically performed based on the operational footprints of the NMS deployments. The NMS deployments in the lower criticality group are forced to upgrade within a short timeline, while the NMS deployments in the higher criticality group are forced to upgrade within a long timeline. Thus, the NMS deployments in the higher criticality group are given a longer grace period before they are forced to upgrade than the NMS deployments in the lower criticality group. As a result, upgrade failures or errors in a new release of the software package may be discovered before the NMS deployments in the higher criticality group are forced to upgrade. If necessary, a new minor version of the software package may be released so that, when the NMS deployments in the higher criticality group are forced to upgrade, they may upgrade to the new minor version. Upgrade failures of those customers may thus be reduced.

Additionally, during upgrade of an NMS deployment, individual network nodes of the NMS deployment may be strategically upgraded. The network nodes may be classified with different criticality scores (e.g., levels of criticality), depending on the characteristics of the network nodes. The less critical network nodes may be upgraded before more critical network nodes are upgraded. Thus, impacts to an organization during an upgrade may be reduced.

Embodiments may achieve advantages. Utilizing the network management system upgrade techniques of the present disclosure may provide a resilient and stable upgrade path for important customers, thereby reducing the quantity of high-profile incidents for the cloud provider. The stability of a new major version of a software package may thus be confirmed before NMS deployments with large operational footprints (e.g., many customers) are impacted by a potentially failed upgrade. Accordingly, network disruptions may be decreased and customer confidence in software upgrades may be increased.

FIG. 1 is a block diagram of a hybrid cloud environment 100, according to some implementations. The hybrid cloud environment 100 is a system that includes multiple private clouds 102 (including a first private cloud 102A and a second private cloud 102B) and a public cloud 110. The public cloud 110 is a publicly accessible computer network operated by a cloud provider. The private clouds 102 are privately accessible computer networks operated by customers of the cloud provider. For example, the hybrid cloud environment 100 may be a central on-premises environment, in which the public cloud 110 provides a central point of control for each private cloud 102, but customers' data is kept on-site at their respective private clouds 102.

The private clouds 102 include NMS deployments 104 (including a first NMS deployment 104A and a second NMS deployment 104B). In this example, the first NMS deployment 104A is deployed at the first private cloud 102A and the second network nodes 106B is deployed at the second private cloud 102B. The NMS deployments 104 include network nodes 106 (including first network nodes 106A and second network nodes 106B for, respectively, the first NMS deployment 104A and the second NMS deployment 104B). The network nodes 106 may include network devices, host servers, and the like. The network devices may include controllers, access points, switches, routers, or the like. The host servers may be bare metal machines that are adapted to host cloud components (e.g., virtual machines, containers, etc.), provide storage, or the like. The network devices of a private cloud 102 form a transport network that provides connectivity and routing between the host servers of the private cloud 102. The network nodes 106 of an NMS deployment 104 may each run software from a same version of a software package for the network management system.

The public cloud 110 includes an NMS control service 112. The NMS control service 112 is adapted to control the NMS deployments 104. For example, the NMS control service 112 may be a central point of control that is accessible by the administrators of the private clouds 102. An administrator of a private cloud 102 may access the NMS control service 112 and use it to control the NMS deployment 104 (e.g., the network nodes 106) of the private cloud 102. Suitable authentication and authorization techniques may be used to limit access to the appropriate administrator (s) of the respective NMS deployments 104. For example, a first administrator of the first private cloud 102A may be permitted to control the first NMS deployment 104A via the NMS control service 112, while a second administrator of the second private cloud 102B may be permitted to control the second NMS deployment 104B via the NMS control service 112.

The NMS control service 112 may include any suitable components. Suitable components include a processor, an application-specific integrated circuit, a microcontroller, memory, and the like. The NMS control service 112 may be a physical device, e.g., an NMS control service computer. For example, the NMS control service 112 may include a processor 114 and a memory 116. The memory 116 may be a non-transitory computer readable medium that stores programming for execution by the processor 114. One or more modules within the NMS control service 112 may be partially or wholly embodied as software and/or hardware for performing any functionality described herein. For example, they may be embodied as software, which is deployed to a physical device using a suitable containerization technique.

The private clouds 102 and the public cloud 110 use the same software package for the network management system. For example, a software package may be deployed to the network nodes 106 of the private clouds 102 as well as to the components (e.g., NMS control service 112, network nodes, etc.) of the public cloud 110. A software package may include software for the network nodes 106, such as software for the network devices, operating system(s) for the host servers, container(s) that will be hosted with the host servers, etc. To avoid a software package mismatch between the public cloud 110 and the private clouds 102, periodic upgrade of the NMS deployments 104 may be mandated. When a new major version of a software package is released, the NMS deployments 104 may be forced to upgrade to the new major version. As subsequently described in greater detail, the NMS control service 112 will coordinate the forced updating of the NMS deployments 104. The timeline in which an NMS deployment 104 is forced to upgrade will be dynamically determined by the NMS control service 112. Specifically, the operational footprint of an NMS deployment 104 will be evaluated to determine the length of the timeline for forced upgrade of the NMS deployment 104. The NMS deployments 104 with a smaller operational footprint will be given a shorter timeline before an upgrade is forced, while the NMS deployments 104 with a larger operational footprint will be given a longer timeline before an upgrade is forced.

The NMS control service 112 may receive commands from a management interface 118 and display output with the management interface 118. The management interface 118 may be a command line interface, a graphical user interface, a web interface, or the like. The NMS control service 112 may process the commands from the management interface 118, validate the commands, and execute logic specified by the commands. Further, the NMS control service 112 may output the results of commands via the management interface 118. An administrator may access the NMS control service 112 using the management interface 118. The management interface 118 may be a central point of access for the NMS control service 112, which is accessible from a public computer network such as the internet.

A package repository 120 may be used to store the versions of the software package. The package repository 120 may be a suitable file store, key-value store, or the like. The package repository 120 may be part of the NMS control service 112 (e.g., stored on a memory of the NMS control service 112) or may be separate from the NMS control service 112 (e.g., may be a file server accessible to the NMS control service 112). The package repository 120 stores different versions 122 of a software package for a network management system. In this example, a first version 122A, a second version 122B, and a third version 122C of the software package are stored on the package repository 120. The first version 122A is a first major version (e.g., "Version 1.0"). The second version 122B and the third version 122C are minor versions of a second major version (e.g., "Version 2.0" and "Version 2.1"). As subsequently described in greater detail, an NMS deployment 104 will be forced to upgrade to a new major version of a software package, but an administrator may choose which minor version of the major version should be used. In this example, the NMS deployments 104 running the first version 122A of the software package will be forced to one of the second version 122B or the third version 122C of the software package, but which of these versions is used may be chosen by the administrator of each NMS deployment 104. Thus, each NMS deployment 104 may be forced to run a same major version of a software package. During an upgrade, the NMS deployments 104 may directly obtain the desired version of the software package from the package repository 120, or may indirectly obtain the desired version of the software package through the NMS control service 112.

Figure 2:
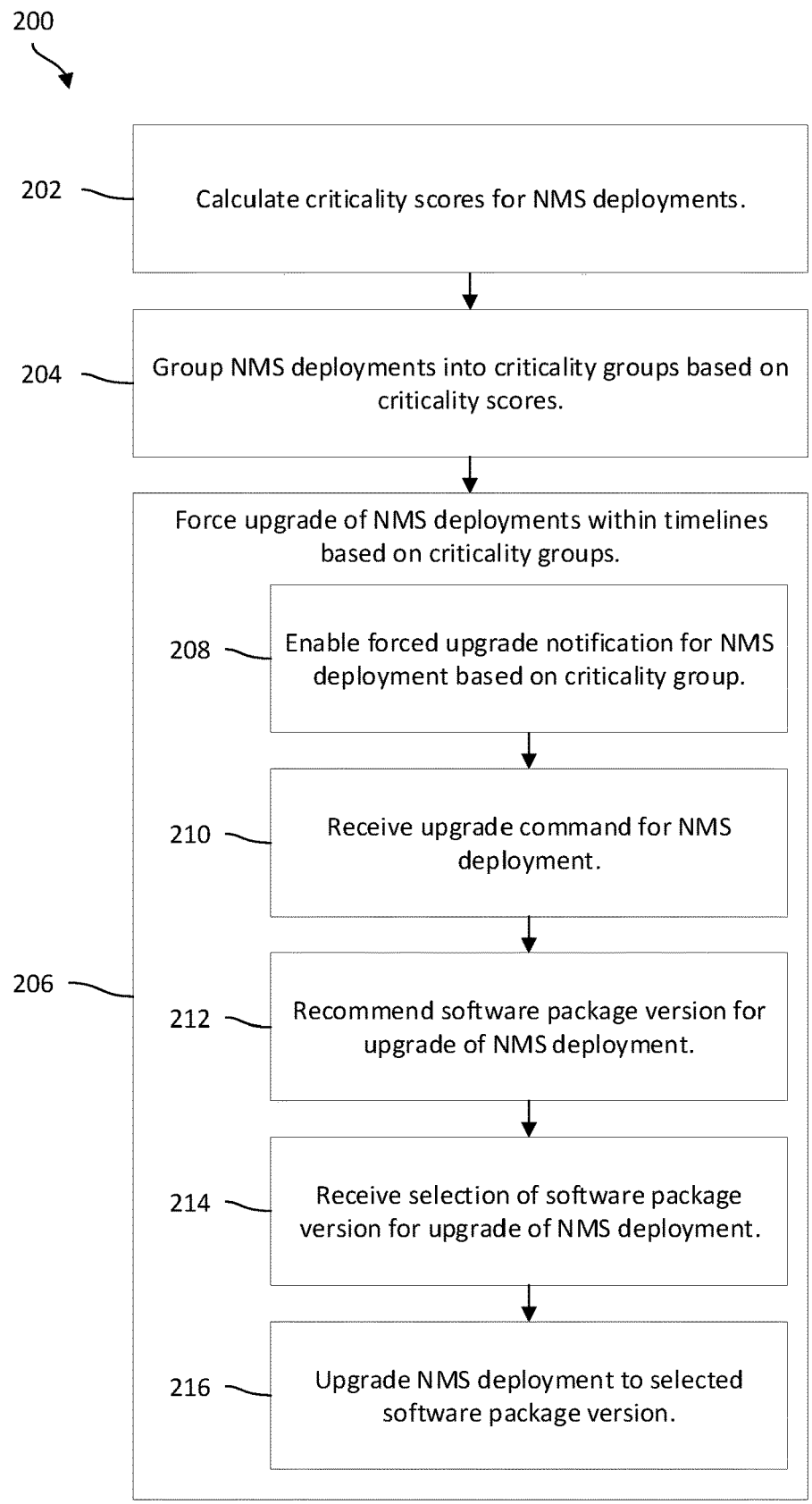
FIG. 2 is a diagram of a network management system upgrade method, according to some implementations.

FIG. 2 is a diagram of an NMS upgrade method 200, according to some implementations. The NMS upgrade method 200 will be described in conjunction with FIG. 1. The NMS upgrade method 200 may be performed by the NMS control service 112 when forcing the NMS deployments 104 to upgrade to a new major version of a software package.

The NMS control service 112 performs a step 202 of calculating criticality scores for the NMS deployments 104. The criticality scores are calculated based on the operational footprints of the NMS deployments 104. An NMS deployment 104 is operated by a customer of the cloud provider, and the criticality score for an NMS deployment 104 is a number that is proportional to the importance of that customer to the cloud provider. An NMS deployment 104 having a large criticality score indicates the corresponding customer is an important customer. For example, an NMS deployment 104 for a hospital may have a larger criticality score than an NMS deployment 104 for a retailer.

The criticality scores for the NMS deployments 104 may be calculated using a suitable clustering algorithm. The clustering algorithm considers multiple characteristics that describe the operational footprints of the NMS deployments 104. For example, the clustering algorithm may consider the locations of the NMS deployments 104, the software currently deployed on the NMS deployments 104, the bandwidth consumption of critical and non-critical applications running across the NMS deployments 104, threat/security scores of the NMS deployments 104, how the NMS deployments 104 are used, client counts of the NMS deployments 104, device types running on the NMS deployments 104, quantities of network nodes 106 of the NMS deployments 104, the industries in which the NMS deployments 104 are being used, the support agreements the cloud provider has with the customers for the NMS deployments 104, the firmware versions of the network nodes 106 for the NMS deployments 104, temporal or seasonal factors, and the like. Details regarding the calculation of the criticality scores for the NMS deployments 104 will be subsequently described in greater detail for FIG. 3.

The NMS control service 112 performs a step 204 of grouping the NMS deployments 104 into criticality groups based on their criticality scores. For example, the NMS deployments 104 may be grouped into lower or higher criticality groups based on their criticality scores. The criticality scores of the NMS deployments 104 in the higher criticality group(s) are greater than the criticality scores of the NMS deployments 104 in the lower criticality group(s). Any number of criticality groups may be utilized. In an example implementation, three criticality groups (including a low criticality group, a medium criticality group, and a high criticality group) are utilized, where the NMS deployments 104 in the medium criticality group have higher criticality scores than the NMS deployments 104 in the low criticality group, and the NMS deployments 104 in the high criticality group have higher criticality scores than the NMS deployments 104 in the medium criticality group. In another example implementation, eight criticality groups are utilized. Each criticality group is defined by a range of criticality scores, and an NMS deployment 104 is placed in a criticality group based on which range the criticality score of that NMS deployment 104 falls within.

The NMS control service 112 performs a step 206 of forcing the NMS deployments 104 to upgrade within timelines that are based on the criticality groups in which the NMS deployments 104 have been grouped. The NMS deployments 104 in the lower criticality group(s) are forced to upgrade within shorter timeline(s) than the NMS deployments 104 in the higher criticality group(s). In the implementation where three criticality groups are utilized, the NMS deployments 104 in the low criticality group are forced to upgrade within a shorter timeline than the NMS deployments 104 in the medium criticality group, and the NMS deployments 104 in the medium criticality group are forced to upgrade within a shorter timeline than the NMS deployments 104 in the high criticality group. For example, the NMS deployments 104 in the low criticality group may be forced to upgrade within a short timeline of 20 days, the NMS deployments 104 in the medium criticality group may be forced to upgrade within a medium timeline of 30 days, and the NMS deployments 104 in the high criticality group may be forced to upgrade within a long timeline of 40 days. Thus, the NMS deployments 104 in the higher criticality group(s) may effectively be given a longer grace period before they are forced to upgrade.

The process for updating each NMS deployment 104 will be subsequently described. The NMS control service may iteratively perform steps 208-216, e.g., once for each NMS deployment 104.

The NMS control service 112 performs a step 208 of enabling a forced upgrade notification for an NMS deployment 104. The forced upgrade notification is enabled based on the criticality group in which the NMS deployment 104 has been grouped. When the forced upgrade notification is enabled for the NMS deployment 104, an administrator for the NMS deployment 104 may be informed via the management interface 118 that an upgrade of the NMS deployment 104 is mandated. For example, upon accessing the management interface 118, a notification is displayed, notifying the administrator that an upgrade is mandated within the timeline that corresponds to the criticality group in which the NMS deployment 104 has been grouped.

In some implementations, the forced upgrade notification is enabled based on the upgrade timeline. Specifically, the enabling of the forced upgrade notification may be delayed for the NMS deployments 104 on longer upgrade timelines. For example, when the NMS control service 112 is in a lower criticality group, the forced upgrade notification may be enabled sooner than it would be, should the NMS control service 112 be in a higher criticality group.

The NMS control service 112 performs a step 210 of receiving an upgrade command for the NMS deployment 104. The upgrade command may be received via the management interface 118, such as from the administrator for the NMS deployment 104. For example, the administrator for the NMS deployment 104 may input the upgrade command to the management interface 118 when they consent to the software package upgrade. The upgrade command may include a maintenance window (within the appropriate timeline), which the administrator for the NMS deployment 104 selects for the upgrade process.

The NMS control service 112 performs a step 212 of recommending a software package version for the upgrade of the NMS deployment 104. The recommendation may be performed in response to receiving the upgrade command. During the forced upgrade, the administrator for the NMS deployment 104 is forced to select a new major version of the software package, but may be free to choose which minor version of the major version should be installed. For example, an NMS deployment 104 running software package Version 1.0 may be forced to upgrade to either Version 2.0 or Version 2.1, but the administrator is free to select which of those two minor versions should be used. A particular minor version may be recommended by the NMS control service 112. The minor version may be recommended based on a known installation history of the available minor versions. For example, if there are two minor versions available for selection, the minor version having a greater quantity of successful installations on other NMS deployments 104 may be recommended. Alternatively or additionally, a minor version may be recommended if the nature of the changes in the minor version are applicable to the NMS deployment 104 being upgraded. For example, if a new minor version includes a fix for a component that is enabled or used in the NMS deployment 104, then the minor version having that fix may be the recommended version.

The NMS control service 112 performs a step 214 of receiving a selection of a software package version for the upgrade of the NMS deployment 104. The selected version may be the one recommended to the administrator for the NMS deployment 104, or may be another version selected by the administrator for the NMS deployment 104. Continuing the previous example, the selected software package version may be Version 2.0 or Version 2.1, as either of those are acceptable minor versions of a new major version, but the selected software package version may not be Version 1.0, as that is an old major version.

The NMS control service 112 performs a step 216 of upgrading the NMS deployment 104 to the selected software package version. The upgrade may be performed in the maintenance window that was selected by the administrator for the NMS deployment 104. Each network node 106 of the NMS deployment 104 is upgraded. The network nodes 106 may be strategically upgraded. Specifically, the network nodes 106 may be classified with different criticality scores. The upgrade of the network nodes 106 may be ordered by their criticality scores, where less critical network nodes 106 are upgraded before more critical network nodes 106 are upgraded. Thus, impacts to an organization by a failed upgrade may be reduced, as the more critical network nodes 106 may remain operational. The process for upgrading the network nodes 106 will be subsequently described in greater detail for FIG. 4.

The NMS control service 112 may optionally perform additional steps (not separately illustrated). For example, a score may be maintained for each minor version. Upon a successful upgrade of an NMS deployment 104, the score for the installed version of the software package may be incremented. The score of a minor version is the quantity of successful installations of that software package version. The software package version that is recommended during step 212 may be selected based the scores of the available minor versions, where the minor version with a highest score is recommended.

Utilizing the NMS upgrade method 200 may provide a resilient and stable upgrade path for customers. The stability of a new major version of a software package may be confirmed before the NMS deployments 104 in the higher criticality group(s) are forced to upgrade, reducing the impact of a potentially failed upgrade on such NMS deployments 104. If failures occur when the NMS deployments 104 in the lower criticality group(s) are forced to upgrade, allowing the NMS deployments 104 in the higher criticality group(s) more time to upgrade gives the cloud provider time to release a new minor version that addresses upgrade failures. The NMS deployments 104 in the higher criticality group(s) may upgrade to that new minor version, instead of to the version that had upgrade failures. Accordingly, disruptions of the NMS deployments 104 may be decreased and customer confidence may be increased.

Figure 3:
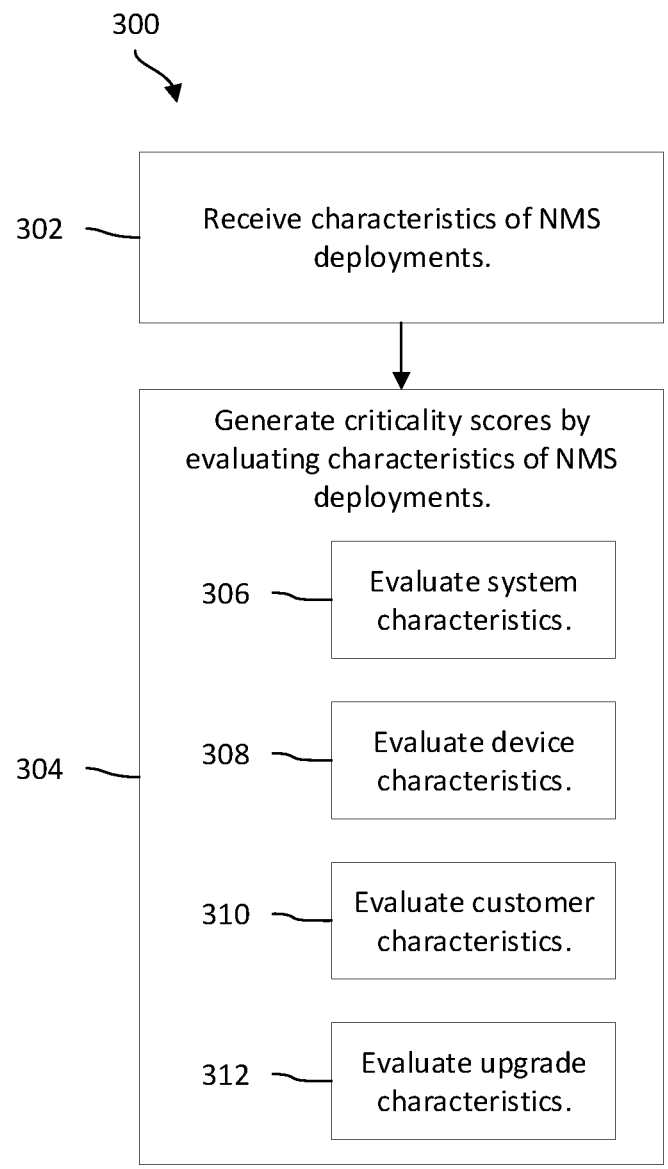
FIG. 3 is a diagram of a network management system criticality scoring method, according to some implementations.

FIG. 3 is a diagram of an NMS criticality scoring method 300, according to some implementations. The NMS criticality scoring method 300 will be described in conjunction with FIG. 1. The NMS criticality scoring method 300 may be performed by the NMS control service 112 when calculating the criticality scores for the NMS deployments 104 during step 202 (see FIG. 2). The criticality scores for multiple NMS deployments 104 may be simultaneously calculated in the same method.

The NMS control service 112 performs a step 302 of receiving NMS characteristics of the NMS deployments 104. The NMS characteristics include metadata that describes the operational footprints of the NMS deployments 104. In an implementation, the NMS characteristics include system characteristics, device characteristics, customer characteristics, upgrade characteristics, combinations thereof, and the like. Each of these characteristics will be subsequently described in greater detail.

The NMS control service 112 performs a step 304 of generating the criticality scores by evaluating the NMS characteristics of the NMS deployments 104. The NMS characteristics may be evaluated with a suitable clustering algorithm. The clustering algorithm groups the NMS deployments 104 into clusters that reflect similar operational and behavioral patterns, and assigns a score to the NMS deployments 104 of each cluster. Optionally, the NMS characteristics may be normalized to a standard scaler before they are evaluated with the clustering algorithm. The normalization may be by a Z-score, percentile score, mathematical variant, or the like.

In some implementations, the NMS control service 112 performs a step 306 of evaluating system characteristics of the NMS deployments 104. The system characteristics are metadata values that represent how the NMS deployments 104 are deployed and configured.

The system characteristics may include the resource capabilities and supported features of the NMS deployments 104 and their network nodes 106; the performance history of the NMS deployments 104 and their network nodes 106 as compared to customers' requirements; the status of critical applications of the NMS deployments 104 (e.g., license expiration status, certificate expiration dates, presence of known security vulnerabilities, etc.); security hardening parameters; feature subscriptions (e.g., which features of the NMS deployments 104 are enabled); the software, configurations, average load, and scale of the NMS deployments 104; the types of licenses activated at the NMS deployments 104 (e.g., evaluation versus paid or premium licenses); and the like. The NMS deployments 104 with a greater degree of these characteristics may have higher criticality scores.

The system characteristics may include the bandwidth consumption of the NMS deployments 104, such as the bandwidth consumption of critical and non-critical applications running across each NMS deployment 104 (which may be evaluated as the percentage of bandwidth used by critical applications versus the percentage of bandwidth used by non-critical applications). The NMS deployments 104 with a greater bandwidth consumption may have higher criticality scores.

The system characteristics may include the traffic patterns of the NMS deployments 104, which may include an evaluation of the following factors for traffic: duration, protocol type, service, flag, source bytes, destination bytes, wrong fragments, packet count, receive error rate, traffic spikes, connection type, destination type, and/or traffic type. The NMS deployments 104 with particular (e.g., larger) traffic patterns may have higher criticality scores.

The system characteristics may include the deployment reputations of the NMS deployments 104, which is the traffic outflow/inflow from users to destinations that may affect the susceptibility of the NMS deployments 104 to social engineering attacks. For example, the deployment reputation of an NMS deployment 104 may be calculated by calculating a weighted sum of one or more of: the total number of unpermitted applications accessed within the NMS deployment 104, the total amount of malware or susceptible URL requests seen in the NMS deployment 104, the total number of prohibited file attachments and/or MIME types in emails seen in devices of the NMS deployment 104, the total number of anomalous intrusions detected on devices of the NMS deployment 104, and the total number of sensitive data breaches detected for the devices of the NMS deployment 104. The NMS deployments 104 with poor deployment reputations (e.g., a high susceptibility to social engineering attacks) may have higher criticality scores.

The system characteristics may include threat/security scores of the NMS deployments 104. The threat/security scores may be calculated based on events related to the individual devices of the NMS deployments 104 (e.g., severity, confidence score, stage, etc. of the events) as well as cross-event correlation information (e.g., stage changes across events) of associated devices or networks in the NMS deployments 104. Events may be generated by tagging data flow from the NMS deployments 104, which can be based on rule-based cases (considering, e.g., domain generation algorithms, HTTP header order detection, BitTorrent traffic, etc.) or third-party data correlation-based cases (e.g., indicators of compromise, FireEye data, etc.). From the events, certain metrics may be extracted for calculating the threat/security scores, such as metrics related to particular high-severity/high-confidence events, the percentage of attack stages that hit the NMS deployments 104, the percentage of detection types that hit the NMS deployments 104, etc. The NMS deployments 104 with higher threat/security scores may have higher criticality scores.

In some implementations, the NMS control service 112 performs a step 308 of evaluating device characteristics of the NMS deployments 104. The device characteristics are metadata values that represent the devices of the NMS deployments 104.

The device characteristics may include the numbers of devices fingerprinting in the NMS deployments 104, such as the total number of mobile phones, tablets, routers, etc. The NMS deployments 104 with larger numbers of devices may have higher criticality scores.

The device characteristics may include the modes of licenses of the network nodes 106 of the NMS deployments 104. The NMS deployments 104 with network nodes 106 having certain modes of licenses may have higher criticality scores.

The device characteristics may include the firmware versions of the network nodes 106 of the NMS deployments 104. The NMS deployments 104 with network nodes 106 having certain firmware versions may have higher criticality scores.

In some implementations, the NMS control service 112 performs a step 310 of evaluating customer characteristics of the NMS deployments 104. The customer characteristics are metadata values that represent the customers of the NMS deployments 104.

The customer characteristics may include the locations of the NMS deployments 104, including geolocation features (e.g., city type, country, security index, etc.) and business activity at the geolocations. High priority locations may be physical locations where critical business tasks are executed, such as the locations of sales teams, C-level offices, etc., and may be identified by an administrator or derived from a floorplan, such as a VisualRF map. The NMS deployments 104 in high priority locations may have higher criticality scores.

The customer characteristics may include enterprise resource planning data for the NMS deployments 104, such as the customers' service level agreement (SLA) with the cloud provider, the amount of revenue generated by the customers, expected future revenue from the customers, reputation of the customers, and the like. The NMS deployments 104 with high service level agreements and/or a large amount of revenue generation may have higher criticality scores.

The customer characteristics may include the industry types for the NMS deployments 104. The industry types for the NMS deployments 104 may be inferred based on the network connections of the NMS deployments 104, such as the LAN connections, WAN connections, MAN connections, etc. For example, customers in education may have a large quantity of floating users and devices with device-based authentication; customers in healthcare may have sensitive data and networks; customers in retail may have many digital transformations and IoT devices; customers in enterprise entities may have many VPN tunnels, large application-aware firewall traffic that is based on access control lists and/or role-based access control; while customers in service providers may have multiple tenants and cloud security policies. The NMS deployments 104 in particular industry types may have higher criticality scores.

The customer characteristics may include the connectivity states of the NMS deployments 104. The NMS deployments 104 with certain connectivity states may have higher criticality scores.

The customer characteristics may include the backup states of the NMS deployments 104. The NMS deployments 104 with certain backup states may have higher criticality scores.

The customer characteristics may include the redundancy configurations of the NMS deployments 104. The NMS deployments 104 with certain redundancy configurations may have higher criticality scores.

In some implementations, the NMS control service 112 performs a step 312 of evaluating upgrade characteristics of the NMS deployments 104. The upgrade characteristics are metadata values that represent past upgrades of the NMS deployments 104. The upgrade characteristics may include historical upgrade results (e.g., whether or not those upgrades were successful) and issues encountered by the NMS deployments 104. The NMS deployments 104 that have historically encountered more upgrade issues may have higher criticality scores.

Any combination of the previously described NMS characteristics (e.g., system characteristics, device characteristics, customer characteristics, and/or upgrade characteristics) may be utilized. The clustering algorithm for calculating the criticality scores of the NMS deployments 104 may be implemented with an operational footprint model. The operational footprint model is a machine learning model that includes one or more neural network(s) trained to automatically evaluate the operational footprints of the NMS deployments 104 and produce the criticality scores. The operational footprint model may evaluate the NMS characteristics for the NMS deployments 104 and generate a criticality score for each of the NMS deployments 104. For example, a Density-Based Spatial Clustering of Applications with Noise (DBSCAN) algorithm may be used to perform density-based clustering with the NMS characteristics, thereby producing the criticality scores. The operational footprint model may have been previously trained using a deep learning process with a set of training characteristics. Which NMS characteristics are evaluated in a particular implementation may depend on the training of the operational footprint model.

Figure 4:
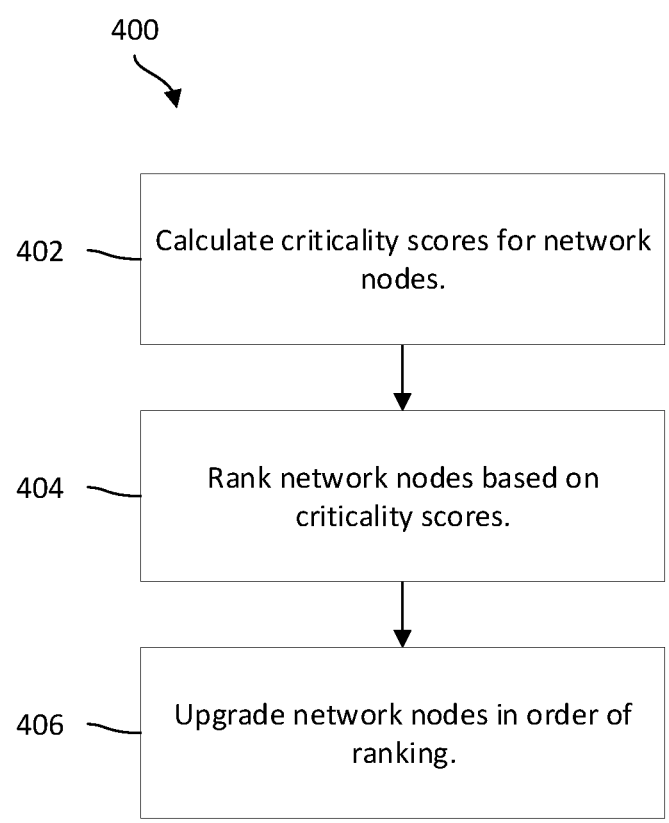
FIG. 4 is a diagram of a network node upgrade method, according to some implementations.

FIG. 4 is a diagram of a network node upgrade method 400, according to some implementations. The network node upgrade method 400 will be described in conjunction with FIG. 1. The network node upgrade method 400 may be performed by the NMS control service 112 when upgrading the network nodes 106 of an NMS deployment 104 during step 216 (see FIG. 2).

The NMS control service 112 performs a step 402 of calculating criticality scores for the network nodes 106. The criticality scores are calculated based on the roles of the network nodes 106. A network node 106 having a large criticality score indicates the network node 106 is operating in a more important role for the NMS deployment 104. For example, a core switch may have a larger criticality score than an access switch.

The criticality scores for the network nodes 106 may be calculated using a suitable weighted sum algorithm. The weighted sum algorithm considers multiple characteristics that describe the roles of the network nodes 106. For example, the weighted sum algorithm may consider the device types of the network nodes 106, the service types of the network nodes 106, and the like. Details regarding the calculation of the criticality scores for the network nodes 106 will be subsequently described in greater detail for FIG. 5.

The NMS control service 112 performs a step 404 of ranking the network nodes 106 based on the criticality scores. Specifically, the network nodes 106 are ranked with ascending criticality scores, such that the network nodes 106 in the beginning of the ranking have lower criticality scores than the network nodes 106 at the end of the ranking.

The NMS control service 112 performs a step 406 of upgrading the network nodes 106 in the order of the ranking. Because the network nodes 106 are ranked with ascending (i.e., low-to-high) criticality scores, the network nodes 106 with lower criticality scores are upgraded before the network nodes 106 with higher criticality scores. Each upgrade of a network node 106 may be completed (and verified as a successful upgrade) before a subsequent network node 106 is upgraded.

Utilizing the network node upgrade method 400 may provide a resilient and stable upgrade path for network nodes 106. Thus, impacts to an organization during an upgrade may be reduced if an upgrade failure occurs. For example, if an upgrade failure occurs, the network nodes 106 of high importance may remain operating.

Figure 5:
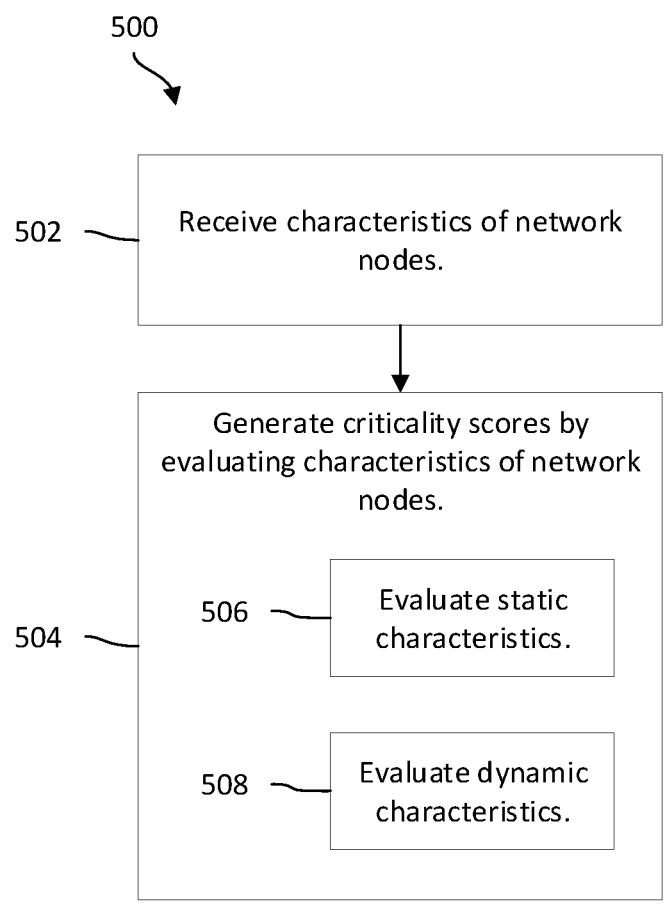
FIG. 5 is a diagram of a node criticality scoring method, according to some implementations.

FIG. 5 is a diagram of a node criticality scoring method 500, according to some implementations. The node criticality scoring method 500 will be described in conjunction with FIG. 1. The node criticality scoring method 500 may be performed by the NMS control service 112 when calculating the criticality scores for the network nodes 106 during step 402 (see FIG. 4). The criticality scores for multiple network nodes 106 may be simultaneously calculated in the same method.

The NMS control service 112 performs a step 502 of receiving node characteristics of the network nodes 106. The node characteristics include metadata about the network nodes 106 that describes the roles of the network nodes 106. In an implementation, the characteristics include static characteristics and dynamic characteristics.

The NMS control service 112 performs a step 504 of generating the criticality scores by evaluating the node characteristics of the network nodes 106. The node characteristics may be evaluated with a suitable weighted sum algorithm. The weighted sum algorithm assigns a score to the network nodes 106 by computing a weighted sum of the node characteristics. Optionally, the node characteristics may be normalized to a standard scaler before they are evaluated. The normalization may be by a Z-score, percentile score, mathematical variant, or the like.

In some implementations, the NMS control service 112 performs a step 506 of evaluating static characteristics of the network nodes 106. The static characteristics are metadata values that represent how the network nodes 106 are installed.

The static characteristics may include the physical resources of the network nodes 106, such as the amount of processing, memory, or storage resource(s) available on the network nodes 106. A high utilization of physical resources on a network node 106 may indicate that more services are running on the network node 106. The network nodes 106 running many services may have higher criticality scores.

The static characteristics may include the device types of the network nodes 106, such as whether the network nodes 106 are conductors or workers. A conductor node may be a more important network node 106 than a worker node. The network nodes 106 that are conductor nodes may have higher criticality scores.

In some implementations, the NMS control service 112 performs a step 508 of evaluating dynamic characteristics of the network nodes 106. The dynamic characteristics are metadata values that represent how the network nodes 106 are configured.

The dynamic characteristics may include the service types of the network nodes 106, specifically, what types of services are running on the network nodes 106 (e.g., stateful services or stateless services). A network node 106 running a stateful service may be a more important network node 106 than a network node 106 running a stateless service. The network nodes 106 running stateful services may have higher criticality scores.

The dynamic characteristics may include the infrastructure or compute services running on the network nodes 106. The network nodes 106 running many infrastructure services may have higher criticality scores.

The dynamic characteristics may include particularly critical services that are running on the network nodes 106. Network nodes 106 running device services (e.g., services accepting device connections) are important for the functioning of the NMS deployment 104. Network nodes 106 running user interface services may also be important for the functioning of the NMS deployment 104. Network nodes 106 running state processing services may also be important for the functioning of the NMS deployment 104. The network nodes 106 running device services, user interface services, and/or state processing services may have higher criticality scores.

Any combination of the previously described node characteristics (e.g., static characteristics and/or dynamic characteristics) may be utilized. For example, the criticality scores of the network nodes 106 may be calculated by calculating a weighted sum of one or more of: normalized physical resources values, normalized node device type values, normalized service type values, normalized infrastructure/compute service score values, and normalized critical service values. The weights may be assigned by the cloud provider or determined by ordinal regression. In an implementation, the weights are previously determined by an ordinal regression algorithm, which may be implemented with an ordinal regression model. The ordinal regression model is a machine learning model that includes one or more neural network(s) trained to automatically calculate the weights for the weighted sum algorithm. The ordinal regression model may have been previously trained using a deep learning process with a set of training data. For example, an administrator may assign relative criticality scores to network nodes of training data. The ordinal regression model may then be used to calculate the weights from the training data based on the assign criticality scores. Those weights may be stored, and then subsequently be used by the weighted sum algorithm to calculate the criticality scores of the network nodes 106.

Figure 6:
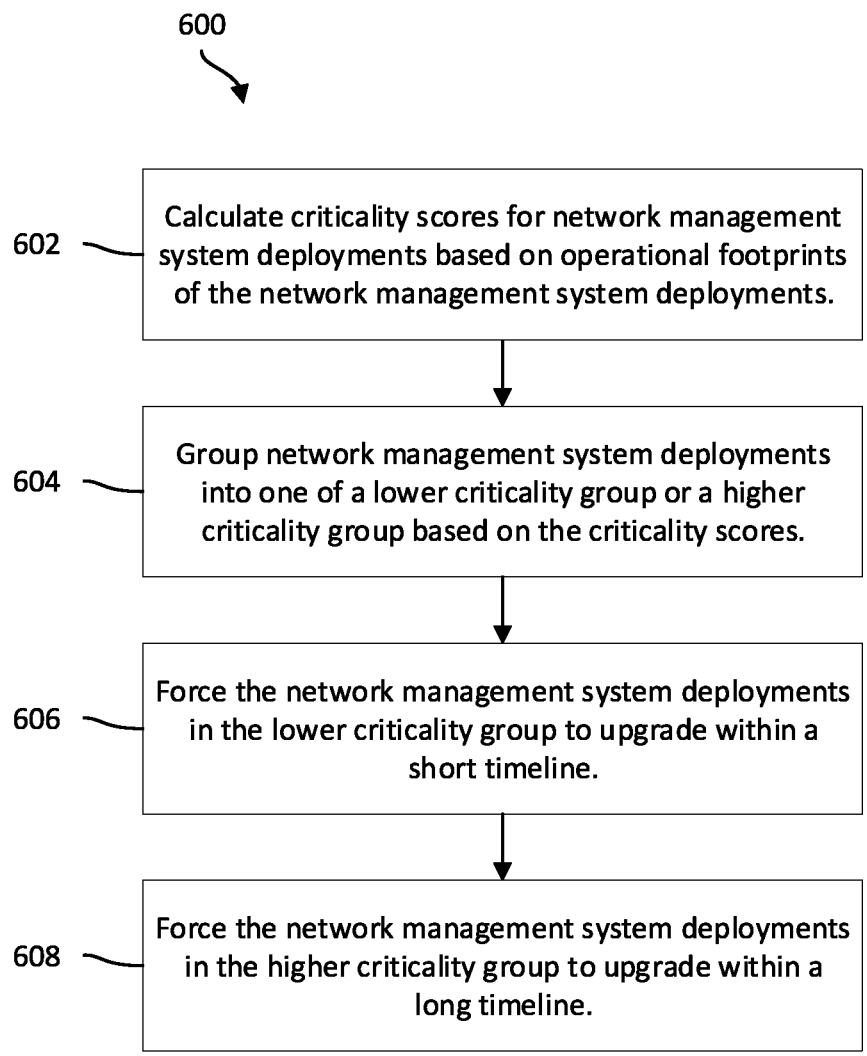
FIG. 6 is a diagram of a network management system upgrade method, according to some implementations.

FIG. 6 is a diagram of an NMS upgrade method 600, according to some implementations. The NMS upgrade method 600 will be described in conjunction with FIG. 1. The NMS upgrade method 600 may be performed by the NMS control service 112 when forcing the NMS deployments 104 to upgrade to a new major version of their software package. In this example implementation, two criticality groups are used.

The NMS control service 112 performs a step 602 of calculating criticality scores for NMS deployments 104 based on operational footprints of the NMS deployments 104. The criticality scores may be calculated using operational footprint model. The NMS control service 112 performs a step 604 of grouping the NMS deployments 104 into one of a lower criticality group or a higher criticality group based on the criticality scores. The criticality scores of the NMS deployments 104 in the higher criticality group are greater than the criticality scores of the NMS deployments 104 in the lower criticality group. The NMS control service 112 performs a step 606 of forcing the NMS deployments 104 in the lower criticality group to upgrade within a short timeline. The NMS control service 112 performs a step 608 of forcing the NMS deployments 104 in the higher criticality group to upgrade within a long timeline. The long timeline is longer than the short timeline.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:
    a plurality of network management system deployments in private clouds, each of the network management system deployments being deployed in a different one of the private clouds; and
    a control service computer in a public cloud, the control service computer configured to:
        calculate criticality scores for the network management system deployments based on operational footprints of the network management system deployments;
        group the network management system deployments into criticality groups based on the criticality scores for the network management system deployments; and
        force the network management system deployments to upgrade within timelines that are based on the criticality groups in which the network management system deployments are grouped.

2. The system of claim 1, wherein a first network management system deployment of the network management system deployments comprises network nodes, and the control service computer forces the first network management system deployment to upgrade by:
    calculating criticality scores for the network nodes based on characteristics of the network nodes;
    ranking the network nodes in an ascending ranking based on the criticality scores for the network nodes; and
    upgrading the network nodes in order of the ascending ranking.

3. The system of claim 1, wherein the criticality scores for the network management system deployments are calculated by evaluating system characteristics of the network management system deployments, the system characteristics comprising one or more of resource capabilities and supported features of the network management system deployments, bandwidth consumption of the network management system deployments, traffic patterns of the network management system deployments, deployment reputations of the network management system deployments, or threat/security scores of the network management system deployments.

4. The system of claim 1, wherein the criticality scores for the network management system deployments are calculated by evaluating device characteristics of the network management system deployments, the device characteristics comprising one or more of numbers of devices fingerprinting in the network management system deployments, modes of licenses of the network management system deployments, or firmware versions of network nodes of the network management system deployments.

5. The system of claim 1, wherein the criticality scores for the network management system deployments are calculated by evaluating customer characteristics of the network management system deployments, the customer characteristics comprising one or more of locations of the network management system deployments, enterprise resource planning data for the network management system deployments, industry types for the network management system deployments, connectivity state of the network management system deployments, backup states of the network management system deployments, or redundancy configurations of the network management system deployments.

6. The system of claim 1, wherein the criticality scores for the network management system deployments are calculated by evaluating upgrade characteristics of the network management system deployments, the upgrade characteristics comprising historical upgrade results of the network management system deployments.

7. The system of claim 1, wherein the criticality scores for the network management system deployments are calculated using an operational footprint model comprising one or more neural networks trained to automatically calculate the criticality scores for the network management system deployments.

8. A method implemented by a control service computer, the method comprising:
    calculating criticality scores for network management system deployments based on operational footprints of the network management system deployments, each of the network management system deployments being deployed in a different private cloud;
    grouping the network management system deployments into one of a lower criticality group or a higher criticality group based on the criticality scores for the network management system deployments, the criticality scores for the network management system deployments in the higher criticality group being greater than the criticality scores for the network management system deployments in the lower criticality group;
    forcing the network management system deployments in the lower criticality group to upgrade within a short timeline; and
    forcing the network management system deployments in the higher criticality group to upgrade within a long timeline, the long timeline being longer than the short timeline.

9. The method of claim 8, wherein a first network management system deployment of the network management system deployments comprises network nodes, and forcing the network management system deployments to upgrade comprises:
- calculating criticality scores for the network nodes based on characteristics of the network nodes;
- ranking the network nodes in an ascending ranking based on the criticality scores for the network nodes; and
- upgrading the network nodes in order of the ascending ranking.

10. The method of claim 9, wherein calculating the criticality scores for the network nodes comprises evaluating static characteristics of the network nodes.

11. The method of claim 9, wherein calculating the criticality scores for the network nodes comprises evaluating dynamic characteristics of the network nodes.

12. The method of claim 8, wherein calculating the criticality scores for the network management system deployments comprises evaluating system characteristics of the network management system deployments.

13. The method of claim 8, wherein calculating the criticality scores for the network management system deployments comprises evaluating device characteristics of the network management system deployments.

14. The method of claim 8, wherein calculating the criticality scores for the network management system deployments comprises evaluating customer characteristics of the network management system deployments.

15. The method of claim 8, wherein calculating the criticality scores for the network management system deployments comprises evaluating upgrade characteristics of the network management system deployments.

16. The method of claim 8, wherein forcing the network management system deployments to upgrade comprises:
- enabling a forced upgrade notification for a first network management system deployment of the network management system deployments;
- receiving an upgrade command for the first network management system deployment;
- recommending a version of a software package for the first network management system deployment;
- receiving a selected version of the software package for the first network management system deployment; and
- upgrading the first network management system deployment to the selected version of the software package.

17. A non-transitory computer readable medium storing instructions which, when executed by a processor, cause the processor to:
- calculate criticality scores for network management system deployments based on operational footprints of the network management system deployments, the network management system deployments being in private clouds, each of the network management system deployments being deployed in a different one of the private clouds;
- group the network management system deployments into criticality groups based on the criticality scores for the network management system deployments; and
- force the network management system deployments to upgrade within timelines that are based on the criticality groups in which the network management system deployments are grouped.

18. The non-transitory computer readable medium of claim 17, wherein the instructions to calculate the criticality scores for the network management system deployments comprise instructions to:
- evaluate system characteristics, device characteristics, customer characteristics, and upgrade characteristics of the network management system deployments.

19. The non-transitory computer readable medium of claim 17, wherein the instructions to force the network management system deployments to upgrade comprise instructions to, for each network management system deployment of the network management system deployments:
- calculate criticality scores for network nodes of the network management system deployment based on characteristics of the network nodes;
- rank the network nodes in an ascending ranking based on the criticality scores for the network nodes; and
- upgrade the network nodes in order of the ascending ranking.

20. The non-transitory computer readable medium of claim 19, wherein the criticality scores for the network management system deployments are calculated using a clustering algorithm and the criticality scores for the network nodes are calculated using a weighted sum algorithm.

* * * * *